United States Patent Office 3,097,954
Patented July 16, 1963

3,097,954
PHOSPHATIC WASTE MATERIALS FOR PRODUCTION OF CERAMIC WARES
Lorenzo Robert Whitaker, R.F.D. 3, U.S. Highway 1, Columbia, S.C.
No Drawing. Filed Oct. 26, 1960, Ser. No. 64,983
4 Claims. (Cl. 106—39)

This invention relates to the production of ceramic construction and/or structural products.

More specifically, the invention relates to the production of ceramic construction products such as brick, tile, flue lining, sewer pipe, or the like (usually called clay products) from mixtures of industrial and natural phosphate wastes such as are available in vast quantities throughout the greater part of the State of Florida and other areas.

Over the past years there has existed a need in the State of Florida for ceramic construction products which could be produced from materials local to their use, or consumption, in order to eliminate the high cost of transportation of such products from distant places. This invention is the result of several years research and pilot plant tests for the purpose of providing construction and/or structural ceramic products from waste materials such as named above, which exist in the many areas where phosphates are mined and conditioned for fertilizers, or reduced for phosphorous, and other commercial products. In brief, the phosphate wastes from these industrial operations exist in so many places in Florida that they are locally available to any area where there is a relatively good demand for ceramic construction products. By natural phosphate waste is meant the covering called overburden which overlies the phosphate rocks or matrix to be mined. This overburden must be removed before the phosphate rocks can be mined, and thus constitutes a natural phosphate waste. Chemical analysis shows that the overburden is relatively low in aluminum phosphate content, and thus can be termed a low grade aluminum phosphate waste.

Industrial phosphate wastes are: (1) phosphate slime resulting from washing with large quantities of water the phosphate rocks after being mined for removing sand tailings and other foreign materials therefrom; and (2) phosphate slag resulting from the manufacture of the element phosphorous through what is commonly termed the electric arc process. Chemical analysis shows that each of these industrial wastes is low in phosphate content.

This invention in brief, resides in finding through research and trial raw materials available from industrial and/or natural phosphate wastes that will provide mixtures for producing by kiln drying and burning ceramic construction products fully meeting the standards and/or requirements (State or Federal) for such products.

It is the primary object of this invention to ascertain the nature and relative amounts of the different phosphate wastes which will basically serve as mixtures for the production of constructon products such as heretofore defined.

It is also an object of this invention that the mixtures provided by the phosphate wastes can be dried and fired in kilns such as customarily used for drying and firing like products produced from clay.

It is a further object of this invention that the basic mixtures of phosphate wastes provided have a relatively long firing range which is important for the production of the ceramic products herein proposed i.e., that the difference between the kiln temperatures when the lower limit is the point when the product is useful, and the higher limit when the product distorts because of heat.

Other objects of this invention and objects relating to the accomplishing of the above objectives will become apparent from the description to follow.

Basically, the concept of this invention resides in the discovery that high grade construction products can be produced from industrial and natural phosphate wastes. Examples of such mixtures of raw materials follow:

EXAMPLE 1

25 to 75% of phosphate slime, and
25 to 75% of overburden phosphate waste.

EXAMPLE 2

25 to 75% of phosphate slime,
25 to 75% of overburden phosphate waste, and
25 to 75% of phosphate slag.

EXAMPLE 3

25 to 75% of phosphate slime, and
25 to75% of phosphate slag.

Chemical analysis of the raw materials constituting Example Mix 1 showed:

|  | Percent |
|---|---|
| Phosphate ($P_2O_5$) | 26 |
| Alumina ($Al_2O_3$) | 24 |
| Iron oxide ($Fe_2O_3$) | 4 |
| Lime (CaO) | 8 |
| Silica ($SiO_2$) | 15 |
| Ignition loss (combined water) | 17 |

The Example 1 yielded 85% sand, approximately 60% mesh, and 15% sand about 200% mesh.

The chemical analysis of Example Mix 2 was about the same as Mix 1 with the exceptions that lime and silica were greater because of the phosphate slag. With Example Mix 3 the chemical analysis approximated that of Mix 1 except for the aluminum phosphate which was much lower.

Further general information concerning the raw materials which constitute the mixtures or compositions above i.e., phosphate slime, low grade aluminum phosphate, and phosphate slag, is necessary for an adequate understanding of my invention.

*Phosphate Slime*

U.S. Patent No. 2,947,418 affords valuable general information respecting Florida phosphate slimes resulting from industrial wastes. The descriptive matter beginning with the second paragraph of column 1 of said patent, and ending with line 53 of column 2, is ample for this application which follows:

"In the mining of phosphate rock, typically the overburden is first removed and the crude ore is mined. This phosphate matrix will be generally composed of about ⅓ recoverable phosphate rock, pebbles and/or boulders, about ⅓ sand tailings and about ⅓ of material of less than 150 mesh particles size. The rock, sand, and clay is conveyed from the mining site in any suitable manner, and usually hydraulically through pipes to a washing plant. In the washing plant, the crude matrix passes through a number of operations designed to clean and recover the rock therefrom. In this operation, large streams of water are used and flowed over the rock to separate therefrom the sand tailings, clay and the small particle material. To an extent, screens are used to provide a further separation, but as a practical matter screenings can only be used for separation and recovery of rather large particle material.

"It will be appreciated that this technique utilizes tremendous amounts of water and that only a partial recovery of the total phosphate values of the matrix is possible. That is, a large portion of the phosphate content of the matrix will be washed away from the recoverable rock in the form of a sludge or slurry of small particles or fines associated with the fine gangue and will pass out of the plant in the water courses.

"In the economics of the operation, it is generally very important to recover as much water as possible for recirculation to the washing plant. To accomplish this, the technique has been to deliver the waste water containing the slurry of fines, gangue, and sand tailings, and any other foreign matter present, into an area where the solids content can settle out. For this purpose, the general practice has been to either use natural depressions in the surrounding terrain, about which retaining dams or dikes are built, or to deposit the slurry in the mine cuts, again contained within extensive and expensive systems of impounding dams. Generally, the slurry of phosphate slimes will contain about 2% to 4% solids by weight, but this figure will vary depending on the character of the matrix and the washing procedure. The general nature and analysis of phosphate slimes is described in United States Patent No. 2,569,323, The slimes solids will gradually settle out of the suspension, and the clarified supernatant water is then drawn off, in what resembles a decantation operation and recycled for use in the plant.

"This process is generally carried out by continuous delivery of the phosphate slimes slurry into one impounding area, and continuous settling of solids and overflow of clarified water, until the surface of the settled slimes reaches the top of the dams or dikes. At this point, the settling site must be abandoned and the operations are transferred to new areas or sites for further settling and clarification procedures, as described above.

"There are a number of unique characteristics of phosphate slimes which are of critical importance in the above-described operations. Among these are included the fact that the phosphate slimes deposited by the above-described method will not settle during the active cycling period to a solids concentration greater than about 25%. The only possible way for increasing the concentration is through further settling and consolidation of the deposit. Even after several years of storage, however, experience has shown that a state of equilibrium is reached, at a concentration of only about 25% solids. This means, of course, that large quantities of water will be contained in the settled slimes and, accordingly, as will be discussed hereinafter in more detail, a large storage volume is required to retain the settled slimes.

"A process of natural evaporation might be expected to remove the water content of the deposit. Of course, if the slimes are stored below ground water level, they will not be subject to such possible evaporation concentration. However, even if the settled material is about ground water level, the further concentration which might have been expected does not occur. Natural evaporation will remove moisture from the surface of the deposit only until a thin crust of material has been dried to about 80% solids. After the upper surface is concentrated by evaporation to about the 80% level, further evaporation of the underlying deposit does not take place. This is due to the fact that in such an evaporation drying process, as the amount of water present gradually decreases until it is about or somewhat more than 20%, the mass becomes virtually impervious to the transfer of moisture. This rather peculiar condition characteristically develops in the zone of deposit immediately under the thin surface crust and effectively prevents the movement of moisture to the exposed surfaces. As a result, it will be seen that the present method of deposition, settling, draining off of the clarified water, and natural evaporation of the deposit will not produce a dried phosphate slime since the deposit automatically seals itself by formation of the crust and prevents further evaporation."

Low Grade Aluminum Phosphate

In the first sentence above copied from Patent 2,947,418, it is stated that in mining phosphate rock, "typically the overburden is first removed and the crude ore is mined." This overburden is the principal source for the low grade aluminum phosphate used in the basic mix examples above for the production of ceramic construction materials. For the higher grade products the low grade aluminum phosphate material is enriched to double the phosphate content. The same enrichment is made to the phosphate slime. These enrichments can be had by the removal of sand and by adding material richer in phosphate.

Phosphate Slag

Phosphate slag is the impure calcium silicate by-product, or waste, in the manufacture of phosphorous by the electric arc process. Calcium phosphate ore and silica ($SiO_2$) are fed into the electric furnace and both fused. The phosphorous is vaporized and condensed; the calcium phosphate combining with the silicate in the fused state. At intervals the furnace is tapped, which allows the fused calcium silicate to flow into water to cool and form slag which sometimes is sold as a concrete aggregate or road gravel. The slag can be easily ground or crushed suitable for the basic mixtures heretofore defined for the production of ceramic construction products.

During the research and trial periods of this invention, the wares produced from phosphate slimes alone were extremely difficult to dry after formation; laminated very badly; were subject to warping, high shrinkage, and the firing range was too short for economical processing. It was found that the lamination difficulties could be reduced by the addition of ground slime calcine but still the product was subject to failure caused by its short firing range.

The addition of sand to the mixture reduced the problems of drying and lamination, and extended the firing range. However, the product continued to be too low in compression strength, and modulus of rupture, as well as too high in porosity to meet the requirements of ceramic construction products, for example, those of the American Society for Testing Materials (ASTM).

It was found that the wares made from the phosphate slimes above gave the desired properties of plasticity, dry strength and ceramic bond. However, some material must be added that has plasticity, with an average grain size much larger than the slimes, and a material not too high in silica content. It was found that the low grade aluminum phosphate overburden overlying the phosphate matrix was a suitable admixture for the slimes to produce ceramic construction products that would pass the A.S.T.M. specifications.

Basically, the mixtures or compositions which will pass the A.S.T.M. specifications or requirements range from 25% phosphate slime and 75% low grade aluminum phosphate overburden, to 75% slime and 25% low grade aluminum phosphate overburden with the optimum of 50% to 66% low grade aluminum phosphate waste overburden mixed with 50 to 34% of phosphate slime.

The research and trials conducted showed that a construction product of a useable quality can be made from a mixture of slime and phosphate slag. It was found that ceramic ware made from a mixture of phosphate slime and phosphate slag such as Example Mix 3, due to larger grain size, will open up the pores in the plastic ceramic body and make safer drying; reduce lamination, reduce shrinkage, and reduce warping; but, such a mix will not extend the firing range to the degree it is extended with a mixture including impure aluminum phosphate material.

It should be here pointed out that the use of calcium phosphate slag as a raw material for producing ceramic construction products provides (after firing) wares lighter in color than when the mix includes low grade aluminum phosphate material.

As before noted herein when the calcium phosphate slag is used with phosphate slime alone, the product has a shorter firing range than when used in a mix containing aluminum phosphate materials. However, when low grade aluminum phosphate waste is used in a mix, whether with slag or not, the firing range of the product is extended. This is also true if the raw aluminum phosphate material has not been enriched with aluminum phosphate.

The slimes used in a mix serve as the plasticizing agent, and to produce dry strength; the calcium phosphate along with the iron compounds add to the red color of the fired ware, as well as the ceramic bond.

The low grade aluminum phosphate waste, due to having larger grain size than the slimes, produces a ware easier to dry; it reduces the lamination of the ware, and it reduces shrinkage both during drying and firing. Also, the aluminum phosphate present in the low grade material acts as a ceramic bond and dilutes the silicate content.

Due to the inversion of quartz when heated, if too much sand is added to a ceramic body, the rapid changes in size of the silica particles will disrupt the ceramic bond of the ware. It was found that aluminum phosphate dilutes the silicate content and it definitely lessens the tendency of silica to break the ceramic bond.

As heretofore stated, the steps for producing construction or structural ceramic products from the basic examples of mixtures stated herein, i.e., raw phosphate waste materials, are those employed for the production of similar ceramic clay products. In brief, any one of the example mixtures can be made from the phosphatic wastes specified. Sufficient water may be added for providing a mix having the desired consistency for moulding or extruding as the case may be. The water content of the slimes as brought from the pit can be used. The mix can be made into the desired shapes, and then dried and fired to effect vitrification. The drying and firing periods are similar to those used for clay products. The firing range for the Example Mixtures 1 and 2 defined herein may be 1500° to 2150° F. while the firing range for products of the Example 3 mixture should be at least 200° F. lower.

Test data respecting brick made from the Example Mixtures 1 and 2 herein with the richness of the phosphates doubled, are set forth below and compared with the A.S.T.M. requirements.

BRICK FIRED AT 2000° F.

|  | P.s.i. |
|---|---|
| Flexure strength | 506 |
| A.S.T.M. requirement | 400 |
| Compressive strength | 4412 |
| A.S.T.M. requirement | 3000 |

|  | Percent |
|---|---|
| Absorption | 11.2 |
| A.S.T.M. requirement | 17.0 |

BRICK FIRED AT 2150° F.

| | | |
|---|---|---|
| Flexure strength | p.s.i. | 708 |
| Compressive strength | p.s.i. | 7243 |
| Absorption strength | percent | 9.6 |

In each case above the A.S.T.M. requirements were for first quality brick.

It was also found that an addition of from 1% to 10% of gypsum to the Mixtures 1, 2 and 3 produced a still lighter colored ceramic product that was the case of Mixture 3. Gypsum (mainly calcium sulphate) is plentiful in the phosphate areas in Florida and at present has no use. The color of the wares is an important factor in the sale thereof.

In summary, this invention establishes that none of the phosphate wastes alone, industrial or natural, will serve to provide for the production of ceramic kiln wares but that the basic mixtures herein of two or more such wastes will serve for the production of such wares.

Obviously, numerous modifications, alterations and deviations to the mixtures defined herein for the production of ceramic construction or structural materials for the purpose of illustration will occur to those skilled in the art without departing from the spirit or scope of this invention as set forth in the appended claims.

I claim:

1. A mix for kiln production of ceramic products which consists essentially of from 25% to 75% by weight of phosphate slime and the balance 25% to 75% by weight of phosphate overburden, said mix having a chemical analysis which approximates: phosphate 26%, alumina 24%, iron oxide 4%, lime 8%, silica 15%, and the balance combined water.

2. A mix as in claim 1 wherein the phosphatic wastes are selected from 25 to 75% of phosphate slime and 25 to 75% of phosphate slag.

3. A mix as in claim 1 wherein the precentages of the phosphatic wastes selected for said mix are enriched with phosphate to approximately double the phosphate analysis thereof.

4. A mix of phosphate slime, phosphate overburden and phosphate slag having such quantity percentages whereby a chemical analysis of said mix by weight approximates: phosphate 26%, alumina 24%, iron oxide 4%, lime 8%, silica 15%, and the balance combined water.

References Cited in the file of this patent

UNITED STATES PATENTS

| 1,033,984 | Brown | July 30, 1912 |
| 1,370,968 | Hoskins | Mar. 8, 1921 |
| 2,569,323 | Maynard | Sept. 25, 1951 |
| 2,947,418 | Gooch | Aug. 2, 1960 |

FOREIGN PATENTS

| 298,637 | Great Britain | Aug. 15, 1929 |
| 635,612 | Great Britain | Apr. 12, 1950 |

OTHER REFERENCES

"Phosphatic Slime," Tyler et al., Ind. and Eng. Chem., vol. 46, No. 5, May 1954 (pp. 1049–1056).